J. R. KILE.
SAFETY CATCH.
APPLICATION FILED OCT. 9, 1911.
1,026,210.
Patented May 14, 1912.
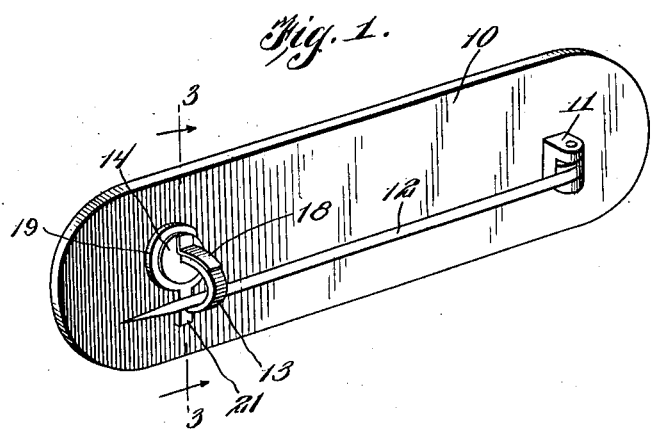
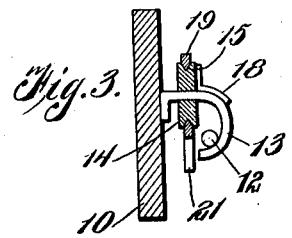
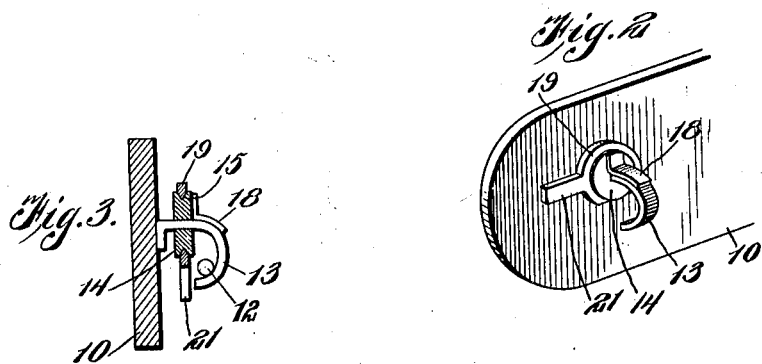
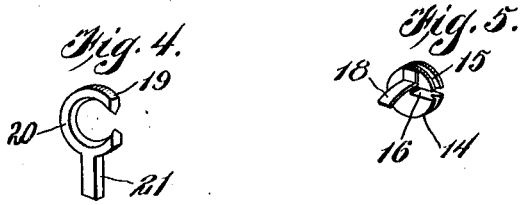
WITNESSES:
Louis R. Heinrichs
C. C. Hines
INVENTOR:
Joseph R. Kile
By Bennett Stone
Attorney.

UNITED STATES PATENT OFFICE.

JOSEPH R. KILE, OF NEODESHA, KANSAS.

SAFETY-CATCH.

1,026,210.  Specification of Letters Patent.  Patented May 14, 1912.

Application filed October 9, 1911.  Serial No. 653,706.

*To all whom it may concern:*

Be it known that I, JOSEPH R. KILE, a citizen of the United States, residing at Neodesha, in the county of Wilson and State of Kansas, have invented certain new and useful Improvements in Safety-Catches, of which the following is a specification.

The invention relates to loss-preventing devices and has for an object to provide a safety catch, particularly adaptable for use in connection with brooches and the like, to retain the free end of the fastening pin thereof in locked engagement with the body of the brooch.

To accomplish the desired result, use is made of a main plate for rigid connection with the pin fastening hook of the brooch and a locking member swivelly mounted on the main plate and operable either to retain the free end of the fastening pin in locked engagement with the mentioned hook or permit of easily disengaging the fastening pin from the hook.

Reference is to be had to the accompanying drawings, constituting a part of this specification, in which similar characters of reference denote corresponding parts in all the views and in which:

Figure 1 is a perspective view, showing the rear side of a brooch, my device being applied thereto and the fastening pin being shown in locked position; Fig. 2 is a fragmentary perspective view of the rear side of a brooch, my device being applied thereto and the locking member being shown in open position; Fig. 3 is a vertical sectional view, taken on the line 3—3 in Fig. 1, looking in the direction of the arrow; Fig. 4 is a perspective view of the locking member, and Fig. 5 is a perspective view of the locking plate.

Referring more particularly to the views, I provide a brooch 10 having a bearing 11 secured to the rear side thereof, a fastening pin 12 being mounted to swing on the said bearing with the free end of the pin adapted for engagement with a hook 13 secured to the rear side of the brooch. A circular plate 14, provided with a peripherally extending groove 15 and a slot 16, is mounted on the hook 13, adjacent the point of connection of the hook with the brooch 10, the said plate being rigidly secured to the hook by an angle plate 18, a portion of the hook being received in the slot 16, as will be readily understood by referring to Figs. 1 and 3.

Mounted to turn on the plate 14 is a locking member 19, consisting of a circular portion 20, having the inner edge thereof tapered to operate in the groove 15 of the plate 14, the said locking member 19 being provided with an integral locking bar 21.

In the use of my device the locking member 19 is first rotated to bring the locking bar 21 in parallel relation to the fastening pin 12, after which the fastening pin is swung on the bearing 11 so that the free end of the pin will engage the hook 13 in the usual manner. The locking member 19 is now rotated so that the locking bar 21 will lie in a plane at right angles to the horizontal plane of the fastening pin 12, the said locking bar when in this position being spaced slightly from the free end of the hook 13, with the intervening space of less distance than the diameter of the fastening pin at the point where the same engages the hook 13. Thus it will be seen that the fastening pin 12 is retained in locked engagement with the hook 13 and, if the fastening pin has been previously connected to the clothing, the brooch will be prevented from becoming detached from the garment, having the fastening pin passed therethrough.

To disengage the fastening pin from the hook 13, the locking member is rotated on the plate 14 to move the locking bar 21 upwardly and away from the free end of the hook 13, thus permitting the operator to easily and quickly remove the fastening pin from engagement with the hook, the space between the free end of the hook and the locking bar being materially increased to allow the fastening pin to be passed therebetween.

Having thus fully described the invention, what I claim as new, is;—

1. The combination, with an article of jewelry or the like having a fastening pin, and a hook to receive the free end of the pin, of a circular supporting plate fixedly mounted on the shank of the hook on the inner side of and in a plane at right angles to the plane of the hook, a locking member embracing and rotatably mounted upon the periphery of said plate, and a bar carried by said member and adjustable therewith to open and close the mouth of the hook.

2. The combination, with an article of jewelry or the like having a fastening pin, and a hook to receive the free end of the pin, of a circular supporting plate rigidly mounted on the shank of the hook in a plane at right angles to the plane of the hook and provided with a tapered peripheral groove, a partially circular locking member rotatably mounted on said plate and having a tapering inner edge engaging said groove, and a bar carried by said member and adjustable therewith to open and close the mouth of the hook.

3. The combination, with an article of jewelry or the like having a fastening pin, and a hook to receive the free end of the pin, of a slotted plate rigidly connected with the shank of the hook in a plane at right angles to the plane of the hook, a portion of the said hook being received in the slot of the said plate, a locking member rotatably mounted on the said plate, and a locking bar formed on the said locking member and adapted to be adjusted therewith to open or close the mouth of the said hook.

In testimony whereof I affix my signature in presence of two witnesses.

JOSEPH R. KILE.

Witnesses:
A. H. WARD,
G. T. KILE.

Copies of this patent may be obtained for five cents each, by addressing the "Commissioner of Patents, Washington, D. C."